(12) United States Patent
Swanson et al.

(10) Patent No.: US 9,148,505 B1
(45) Date of Patent: Sep. 29, 2015

(54) DIGITAL SUBSCRIBER LINE IDENTIFICATION METHOD

(71) Applicant: Fluke Corporation, Everett, WA (US)

(72) Inventors: Paul S. Swanson, Monument, CO (US); Clinton J. Wooton, Lake Stevens, WA (US); Michael Imhof, Bothell, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 14/597,967

(22) Filed: Jan. 15, 2015

(51) Int. Cl.
*H04M 1/24* (2006.01)
*H04M 3/08* (2006.01)
*H04M 3/22* (2006.01)
*H04M 3/30* (2006.01)

(52) U.S. Cl.
CPC .............. *H04M 3/308* (2013.01); *H04M 3/229* (2013.01); *H04M 3/2209* (2013.01)

(58) Field of Classification Search
CPC ..... H04M 1/24; H04B 3/46; H04B 10/25751; G01R 1/07; H04L 12/2697
USPC .................. 379/1.03, 1.04, 21, 27.01, 32.01; 324/445, 446, 448, 690, 750.15, 324/754.01, 754.02, 754.03, 754.1, 754.11
See application file for complete search history.

(56) References Cited

U.S. PATENT DOCUMENTS

| | | | | |
|---|---|---|---|---|
| 5,539,803 | A * | 7/1996 | Bhat et al. | 379/21 |
| 5,703,928 | A * | 12/1997 | Galloway et al. | 379/21 |
| 5,770,971 | A * | 6/1998 | McNicol | 330/52 |
| 6,301,337 | B1 * | 10/2001 | Scholtz et al. | 379/30 |
| 6,411,108 | B1 * | 6/2002 | Douglas et al. | 324/658 |
| 6,545,483 | B1 * | 4/2003 | Douglas | 324/525 |
| 7,026,803 | B2 * | 4/2006 | Kurth | 324/66 |
| 8,798,470 | B2 * | 8/2014 | Boyd et al. | 398/72 |
| 2008/0002639 | A1 * | 1/2008 | Hummer | 370/338 |
| 2010/0239050 | A1 * | 9/2010 | Chang et al. | 375/324 |
| 2013/0101092 | A1 * | 4/2013 | Wahl et al. | 379/21 |
| 2013/0207681 | A1 * | 8/2013 | Slupsky et al. | 324/754.21 |

* cited by examiner

*Primary Examiner* — Binh Tieu
(74) *Attorney, Agent, or Firm* — Locke Lord LLP; Scott D. Wofsy; Christopher J. Capelli

(57) ABSTRACT

A hand held test instrument for testing a DSL line is provided. The test instrument includes an interface for unintrusive connection with the DSL under test. The interface is configured to capture Radio Frequency (RF) signals corresponding to a portion of a data stream transmitted by a communication device over the DSL under test. The hand held test instrument further includes a controller module configured to identify unique characteristics of the communication device based on the captured RF signals.

11 Claims, 6 Drawing Sheets

DIGITAL SUBSCRIBER LINE IDENTIFICATION METHOD

FIELD OF THE INVENTION

The present invention relates to cable testing devices and, more particularly, relates to Digital Subscriber Line (DSL) identification method using a hand held device.

BACKGROUND OF THE INVENTION

The explosive growth of telecommunications services and products is fostered by improving features and accessibility. Data connections, such as DSL, have become increasingly popular. On the other hand, plain old telephone service (POTS) has become less relevant to many users.

In order to convey telecommunication signals over a traditional telephone line, telephone companies typically supply tip and ring voltage and loop current to support a number of functions including carrying analog voice signals and performing various signaling functions on the telephone line. To be recognized by various switch equipment, telephone devices connected to POTS telephone lines typically generate tones referred to as DTMF (dual-tone multi-frequency) signals. DTMF signals comprise first and second sine wave signals that are added together to encode the number to be dialed. However, DSL technologies provide significantly greater bandwidth as compared to analog telephone equipment.

There are a number of DSL specifications, including ADSL (Asymmetric Digital Subscriber Line), ADSL-Lite, R-ADSL (Rate Adaptive Digital Subscriber Line), HDSL (High Speed Digital Subscriber Line), SDSL (Symmetrical Digital Subscriber Line), and VDSL (Very High Speed Digital Subscriber Line), which are referred to collectively as DSL technologies. In one of the more popular versions of DSL, ADSL, a twisted pair carries two types of duplexed signals over different frequency bands. The first signal is the voice signal, generally at 4 KHz and below. The second signal is the data signal, generally modulated at above 4 KHz. With the advent of DSL, the traditional tip and ring voltage and loop current functions are increasingly being replaced with high speed digital signals capable of carrying voice, data and video information to and from a subscriber in a digital fashion.

Communications field service technicians maintaining POTS lines traditionally used a test instrument called a phone test set or lineman's handset. The test set is used by the technician in the installation and troubleshooting of analog phone systems. One of the functions performed by field service technicians is to verify that the real physical circuit being tested is actually the circuit with the reported problem before the technician begins to troubleshoot the issue. The conventional phone test set can be used for line identification purposes by attaching to a circuit and dialing a specific phone number that generates an automated response indicating "the number you are dialing from is xxx-xxx-xxxx." Thus, the telephone number being a unique identifier for the subscriber can help field service technicians to confirm that they identified the correct wire pair from potentially hundreds or thousands of circuits typically present in a junction box. However, with the removal of loop current and ring voltages from existing telephone lines traditional phone test instruments can no longer be used for line identification purposes.

Accordingly, it may be desirable to determine line identifier information from a DSL circuit without using conventional loop current and ring voltages.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a hand held test instrument for testing a DSL line is provided. The test instrument includes an interface for unintrusive connection with a DSL under test. The interface is configured to capture Radio Frequency (RF) signals corresponding to a portion of a data stream transmitted by a communication device over the DSL under test. The hand held test instrument further includes a controller module configured to identify unique characteristics of the communication device based on the captured RF signals.

In another aspect, a method for identifying a DSL line using a hand held test instrument is provided. RF signals corresponding to a portion of a data stream transmitted by a communication device over the DSL under test are captured by placing an interface of the hand held test instrument within a predetermined distance from the DSL under test. A desired frequency portion of the captured RF signals is isolated. The isolated portion of the captured RF signals is converted into digitized signals. Unique characteristics of the communication device are identified by a controller module of the hand held test instrument, based on the converted digitized signals.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art.

Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

Figure 1:
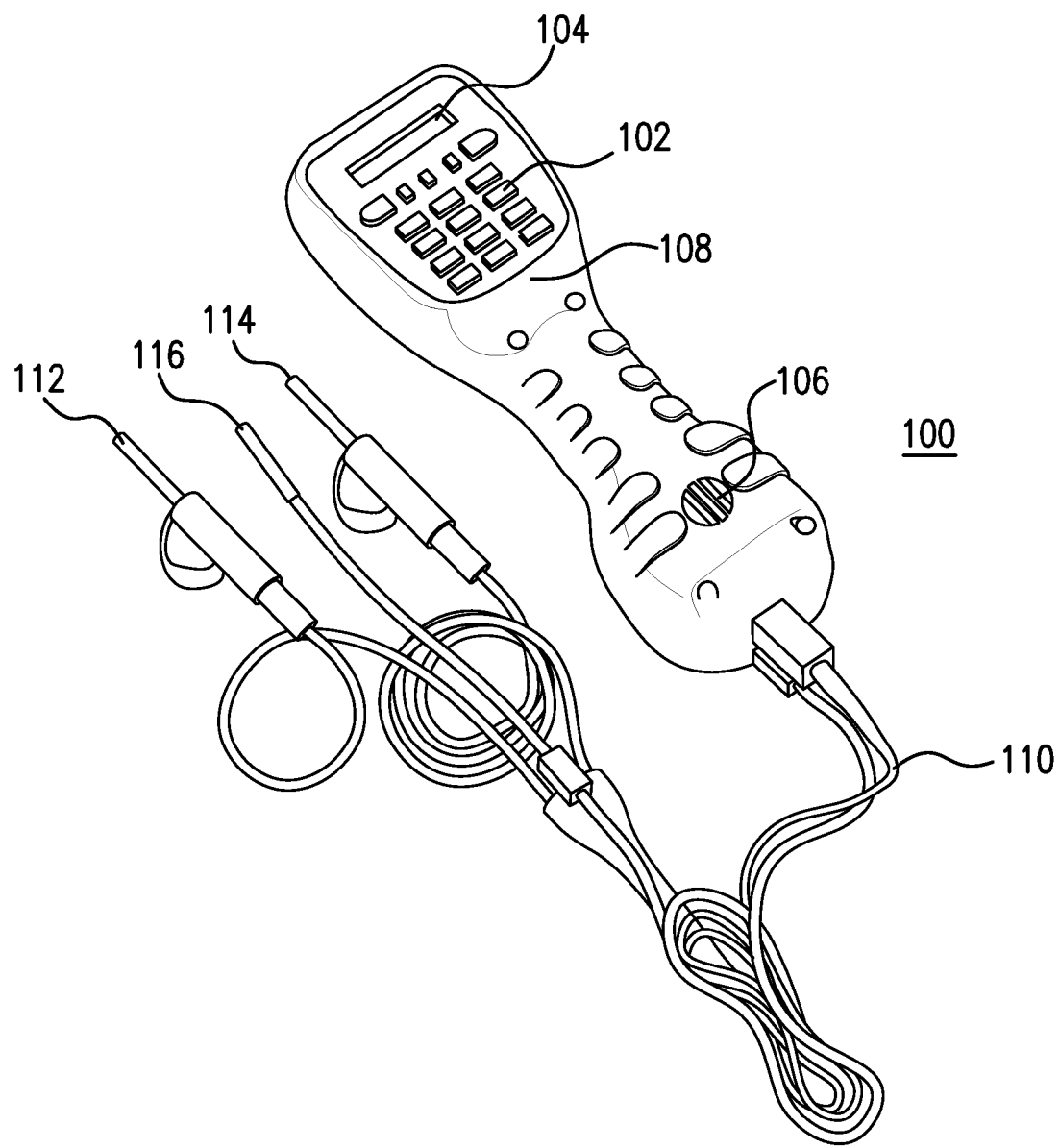
FIG. 1 is a view of a conventional phone test set.

Turning now descriptively to the drawings, in which similar reference characters denote similar elements throughout the several views, FIG. 1 depicts a conventional phone test set that may be used by communications field service technicians in the installation and troubleshooting of analog phone systems.

FIG. 1 is a view of a prior art phone test set 100 which is a hand held device comprising an input keypad 102 and alphanumeric display 104. Microphone 108 and speaker 106 enable the technician to speak and listen to use the device as a telephone. Cables 110 connect alligator clips 112, 114 and modular plug 116 to the test set to enable connection to telephone wiring of the phone systems under test. As previously indicated, one of features of phone test set 100 enables field service technicians to verify that the real physical circuit being tested is actually the circuit with the reported problem before the technician begins to troubleshoot the issue. The phone test set 100 can be used for line identification purposes by attaching to a telephone circuit using clips 112 and 114 and dialing a specific phone number via input keypad 102. However, this method of phone line identification utilizes conventional loop current and ring voltages which may not exist in contemporary DSL only lines carrying multiple digital signals.

Figure 2:
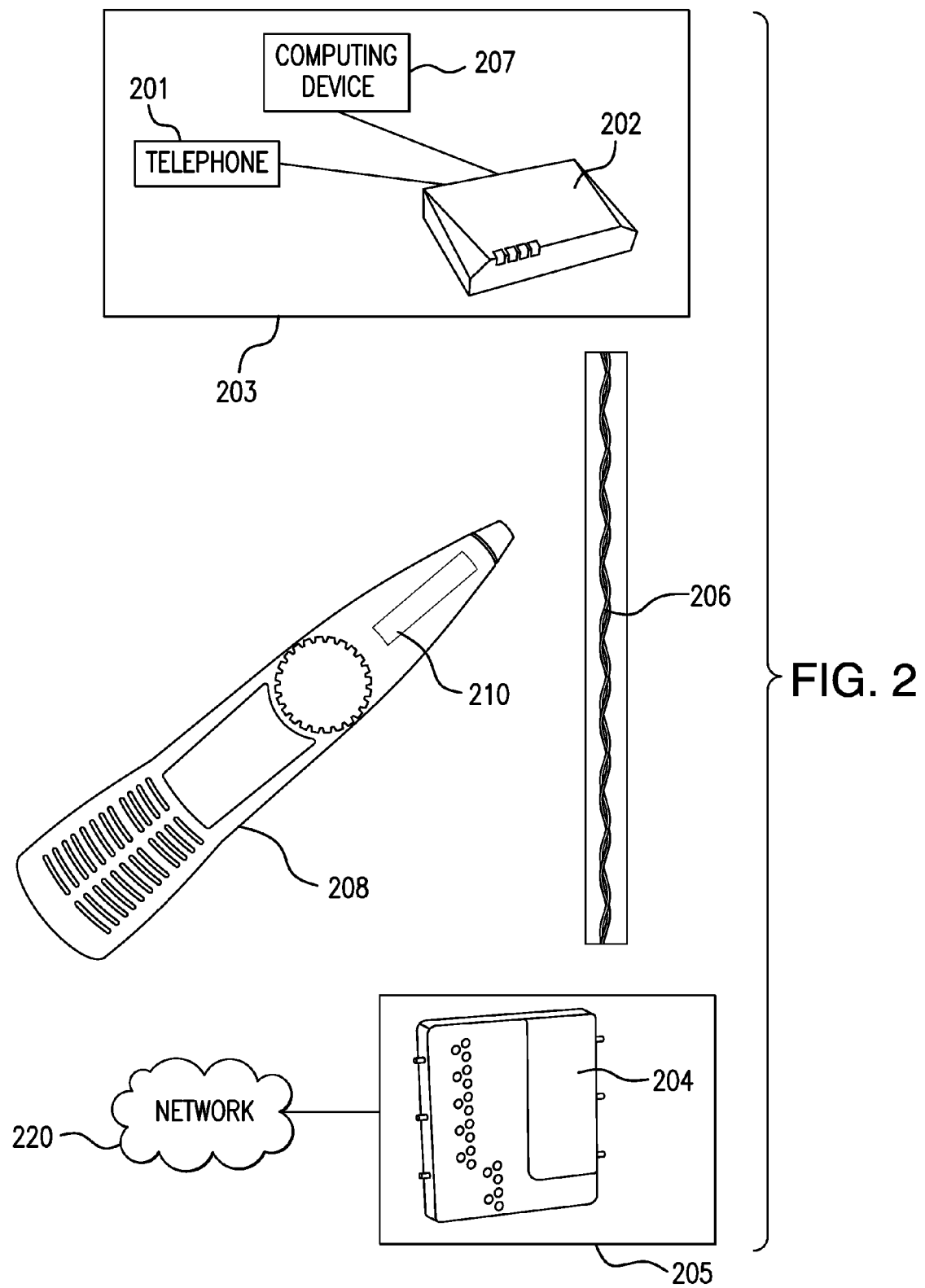
FIG. 2 is a diagram of an exemplary environment in which methods described herein may be implemented.

FIG. 2 is a diagram of an exemplary environment in which methods described herein may be implemented.

DSL is typically offered to subscribers by DSL providers. DSL providers connect DSL modems 202, through a digital subscriber line 206, to a central office 205. At the central office 205, signals from the DSL subscriber may be packetized and transmitted to a larger network 220.

Network 220 may include a Local Area Network (LAN), a wide area network (WAN), such as a cellular network, a satellite network, a broadcast television based network, the Internet, a private WAN, or a combination of the Internet and a private WAN, that is used to transport data. Network 220 may include a number of separate networks that function to provide services to customer premises 203. In one implementation, network 220 may be a network that provides voice and data services for subscriber premises 203. Network 220 may include a high capacity data backbone associated with a DSL provider. For instance, network 220 may include a circuit-switched telephone network and a packet-based data network. Subscriber premises 203 may be connected, through central office 205, to network 220.

Central office 205 may represent a physical location, generally controlled by the DSL provider, through which subscriber premises 203 connect to network 220. Central office 205 may be located relatively close to subscriber premises 205 (e.g., within three or four miles).

Central office 205 may particularly include a digital subscriber line access multiplexer (DSLAM) 204. DSLAM 204 may connect multiple lines (i.e., lines from multiple subscriber premises 203) to network 220. In general, DSLAM 204 may collect data from a plurality of modem ports and aggregate the voice and data traffic into one complex composite signal via multiplexing. Depending on its device architecture and setup, DSLAM 204 may aggregate DSL lines over Asynchronous Transfer Mode (ATM), frame relay, and/or an Internet Protocol network. The aggregated traffic may then be directed to network 220. Although shown located within central office 205, in some implementations, DSLAM 204 may be located at locations external to central office 205.

Subscriber premise 203 may represent a subscriber to the DSL service offered by the DSL provider. Subscriber premise 203 may connect to central office 205 through conventional twisted pair cabling 206. A subscriber premise, such as subscriber premise 203, may include, for example, one or more standard telephones 201, a DSL modem 202, and one or more computing devices 207. Telephone 201 may include a conventional analog phone through which a user may place and receive calls. DSL modem 202 may include circuitry to modulate high frequency tones for transmission to DSLAM 204. DSL modem 202 may correspondingly receive and demodulate signals from DSLAM 204. DSL modem 202 may provide a data connection to computing device 207 via, for example, an Ethernet or Universal Serial Bus (USB) connection. In some implementations, DSL modem 202 may also include an integrated router. In these situations, DSL modem 202, in addition to converting between DSL frequency signals and Ethernet signals, may provide local routing services to computing devices 207. DSLAM 204 is typically connected to the customer's telephone line 206 through a cross-box or other connection frame. The cross-box or connection frame may have many connections to many customers. A difficulty arises in that the technician making the connections or troubleshooting in the cross-box may not properly connect DSLAM 204 to the intended customer's telephone line. For example, the connection from DSLAM 204 may be made to another customer's lines rather than the telephone lines of the intended customer. When this occurs, DSL modem 202 at the intended subscriber's premise 203 will not synchronize with DSLAM 204 and the customer's DSL service will not activate.

FIG. 2 depicts a hand held device 208 (testing device) designed to test the DSL service of a subscriber at various locations, including cross-boxes and/or other connection frames. Test device 208 may particularly include hardware designed to test the telephone line 206 associated with a specific DSL subscriber. Advantageously, one of the features of test instrument 208 may enable technicians to identify a desired DSL circuit by identifying unique characteristics of the communication device, such as DSL modem 202, connected to the DSL line under test. As described in more detail below, test instrument 208 may include an interface capable of establishing unintrusive connection with the DSL line under test. In other words, test instrument 208 is preferably capable of identifying DSL under test substantially without affecting any of the active DSL sessions. In one embodiment, test instrument 208 may comprise a non-contact data safe probe. As shown in FIG. 2, test instrument 208 may include a display 210 for indicating DSL identifying information to users, such as field service technicians.

DSL technology and improvements thereon including, G.Lite, ADSL, VDSL and HDSL all of which are broadly identified as X-DSL have been developed to increase the effective bandwidth of existing subscriber line 206 connections, without requiring the installation of new fiber optic cable. DSL modem 202 operates at frequencies higher than the voice band frequencies, thus DSL modem 202 may operate simultaneously with a telephone conversation. The subscriber line 206 used in an illustrated embodiment of the present invention can handle any current or evolving standard of X-DSL. According to a preferred embodiment of the present invention, hand held test instrument 208 may also support any current or evolving X-DSL standard.

Figure 3:
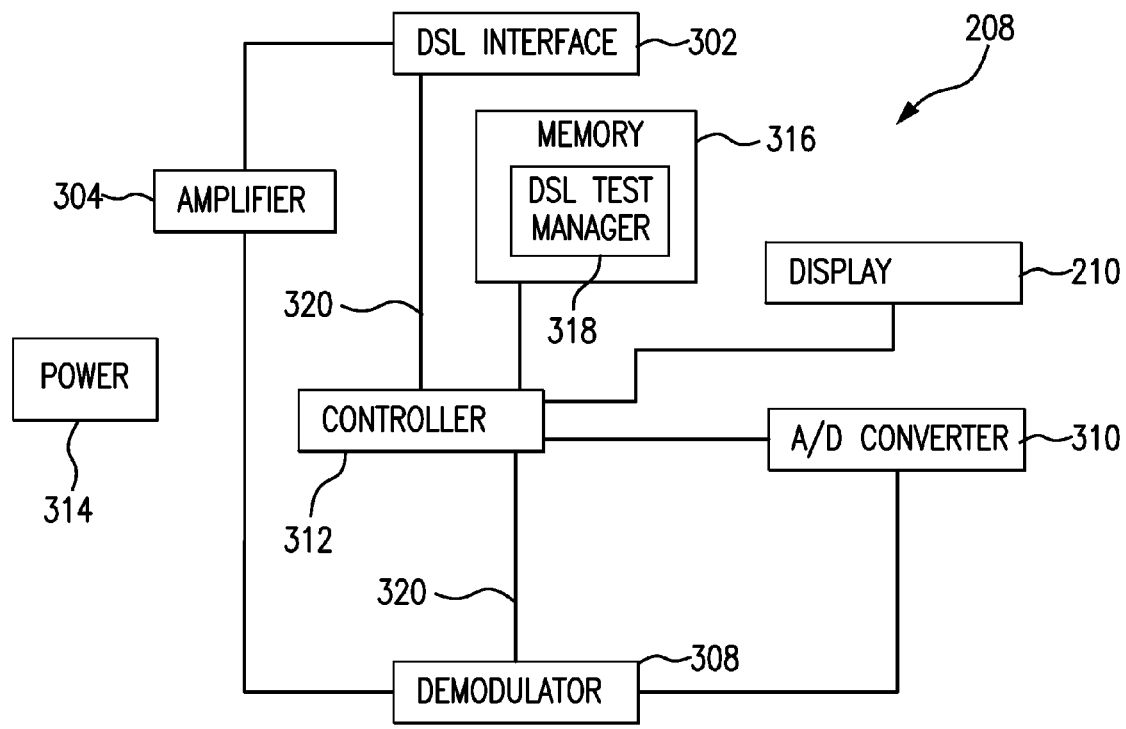
FIG. 3 is a block diagram of an exemplary hand held testing device which may correspond to the testing device shown in FIG. 2, in accordance with an embodiment of the present invention.

FIG. 3 is a block diagram of an exemplary hand held testing device which may correspond to the test instrument shown in FIG. 2, in accordance with an embodiment of the present invention. As illustrated, in one non-limiting embodiment, testing device 208 may include a DSL interface 302, an amplifier 304, a demodulator 308, an Analog-to-Digital (A/D) converter 310, a display unit 210, a controller module 312, a power block 314, a memory 316 and a bus 320. Bus 320 may include a path that permits communication among the elements of testing device 208.

Power block 314 may provide operational power to the testing device 208, and may comprise battery power, for example. The power block 314 may comprise supply of different characteristics of power as the various components may not all have the same power requirements.

DSL interface 302 may include an interface configured to be in communication with the DSL under test 206. In one embodiment, DSL interface 302 may be capable to detachably connect and make electrical contact with a small portion (e.g., a half-twist) of the twisted-pair telephone line 206. It is noted that telephone copper pairs (twisted pairs) are typically twisted at a rate low enough that a sensor could pick up data along the unshielded cable 206 itself. Thus, according to another embodiment of the present invention, DSL interface 302 may include an antenna configured to sense electromagnetic fields of a predetermined frequency (for example, RF electromagnetic fields with frequencies in the range of approximately 15 KHz to approximately 30 MHz). In a preferred embodiment, DSL interface 302 may be used for contactless short-range communications, as illustrated below in conjunction with FIG. 4. Moreover, DSL interface 302 may be configured to generate a low-power radio frequency signal representative of an amplitude modulated electromagnetic field sensed by DSL interface 302 and to provide the signal to RF amplifier 304.

RF power amplifier 304 may comprise an electronic amplifier used to convert the received low-power radio-frequency signal into a larger signal of significant power, for subsequent signal processing described below. In one embodiment basic RF amplifier component 304 may include an input circuit, a splitter, a final stage and a combiner that operate together to deliver the amplified output signal.

Various DSL technologies typically use a special form of a quadrature amplitude modulation (QAM). The aim of digital modulation is to transfer a digital bit stream over an analog band pass channel, for example over the twisted pair line 206. A demodulator is a component that performs demodulation, the inverse of modulation.

According to an embodiment of the present invention, the testing device 208 may include a quadrature demodulator 308 coupled to an output of RF power amplifier 304 and capable of synchronously detecting two baseband signals, i.e., an I signal (in-phase component) and a Q signal (quadrature component) that are in quadrature with each other, such as signals modulated by QAM. A specific example of a quadrature demodulator 308 will be described below with reference to FIG. 5. Demodulated outputs I and Q signals are input to one or more analog/digital (A/D) converters 310. The A/D converter 310 is configured to convert the I and Q components to yield digitized signals representative of the RF signals captured by DSL interface 302. In addition, A/D converter 310 may be configured to send the generated digital signals to controller module 312.

In one embodiment of the present invention, controller module 312 may include one or more processors, microprocessors, or other types of processing devices that may interpret and execute instructions. It should be noted that controller module 312, in optional embodiments, may comprise an application specific integrated circuit (ASIC), a field-programmable gate array (FPGA) or the like. Memory 316 may include a random access memory (RAM) or another type of dynamic storage device that may store information and instructions for execution by controller unit 312.

As described herein, testing device 208 may perform certain operations in response to controller module 312 executing software instructions contained in a computer-readable medium, such as memory 316. A computer-readable medium may be defined as a physical or logical memory device. A logical memory device may include memory space within a single physical memory device or spread across multiple physical memory devices. The software instructions may be read into memory 316 from another computer-readable medium. The software instructions contained in memory 316 may cause controller 312 to perform processes described herein. Alternatively, hardwired circuitry may be used in place of or in combination with software instructions to implement processes described herein. Thus, implementations described herein are not limited to any specific combination of hardware circuitry and software.

As particularly shown in FIG. 3, controller 312 may particularly execute instructions stored in memory 316, such as instructions that implement DSL test manager 318. DSL test manager 318 may provide a testing service to test a DSL line 206. In general, DSL test manager 318 may be configured to identify unique characteristics of the communication device, such as DSL modem 202, connected to the DSL line 206 based on the RF signals captured by DSL interface 302. In one embodiment, DSL test manager 318 may be configured to decode a portion of the data stream transmitted over the DSL line under test 206 and to determine a Media Access Control (MAC) address (or other unique identifier in the data stream) associated with DSL modem 202. Computer program code for carrying out operations for aspects of the present invention may be written in any combination of one or more programming languages.

Figure 4:
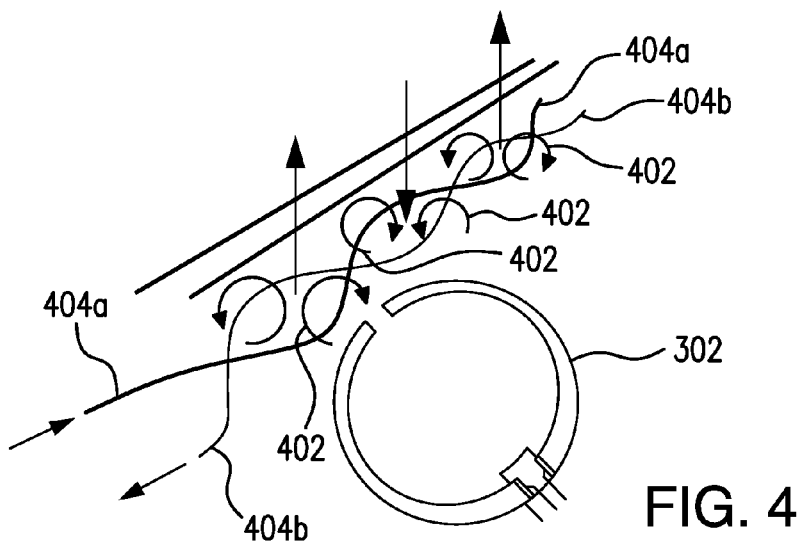
FIG. 4 illustrates the operation of a non-intrusive interface of the testing device shown in FIG. 3, according to one embodiment of the present invention.

FIG. 4 illustrates the operation of a non-intrusive interface of the testing device shown in FIG. 3, according to one embodiment of the present invention. As previously noted, ascertaining the identity of a DSL line is a real concern for technicians troubleshooting at a cross-box or other connection frame, since such connection frame may include hundreds or even thousands of wires. Randomly disturbing another twisted pair wire is undesirable, since such a mistake may take down digital data services being streamed to another customer and thus may lead to customers' dissatisfaction with the provided services. Advantageously, a non-contact data safe DSL interface of testing device 208 described below overcomes difficulties faced by the field technicians.

As mentioned above, ADSL is one of the most popular DSL standards. Discrete multi-tone (DMT) has been chosen as the line code for the ADSL standard. The ADSL standard divides the DMT spectrum into 256 4-KHz carrier bands and a QAM type of constellation is used to load a variable number of bits onto each carrier band independently of the other carrier bands. Each carrier band carries portion of the data to and from a subscriber. The twisted pair, such as twisted pair 206 shown in FIG. 2, consists of pairs of wires. The wires are wound in a spiral in order to, through the cancellation effect, reduce noise and maintain the electrical properties of the medium constant throughout its length.

FIG. 4 further illustrates inductive coupling effect in twisted pair wires. As shown, a twisted pair may include a first wire 404a and a second wire 404b. In each of the wires 404 magnetic field changes direction every half twist, as indicated by magnetic flux lines 402. In one embodiment, non-contact DSL interface 302 of the testing device 208 may be implemented as an electromagnetic probe known as Faraday loop. Faraday loop relies on the Faraday Effect. In accordance with the Faraday Effect, a charge moving inside a conductor will produce a circular magnetic field around the conductor. Thus, by placing a non-contact DSL interface 302 parallel to the direction of the magnetic field lines 402 the magnitude of the current flowing through wires 404 can be measured. It is noted that DSL interface 302 of testing device 208 should be placed within a predetermined distance (in the range of approximately 1-2 cm) from DSL line under test (i.e., twisted pair wires 404a and 404b). In accordance with further advantageous features of the present invention, the DSL interface 302 is loosely coupled to DSL under test 404 such that there is substantially no direct interaction between the DSL circuit and the sensor circuit of DSL interface 302, thereby preventing the testing device 208 from affecting the active DSL session.

Figure 5:
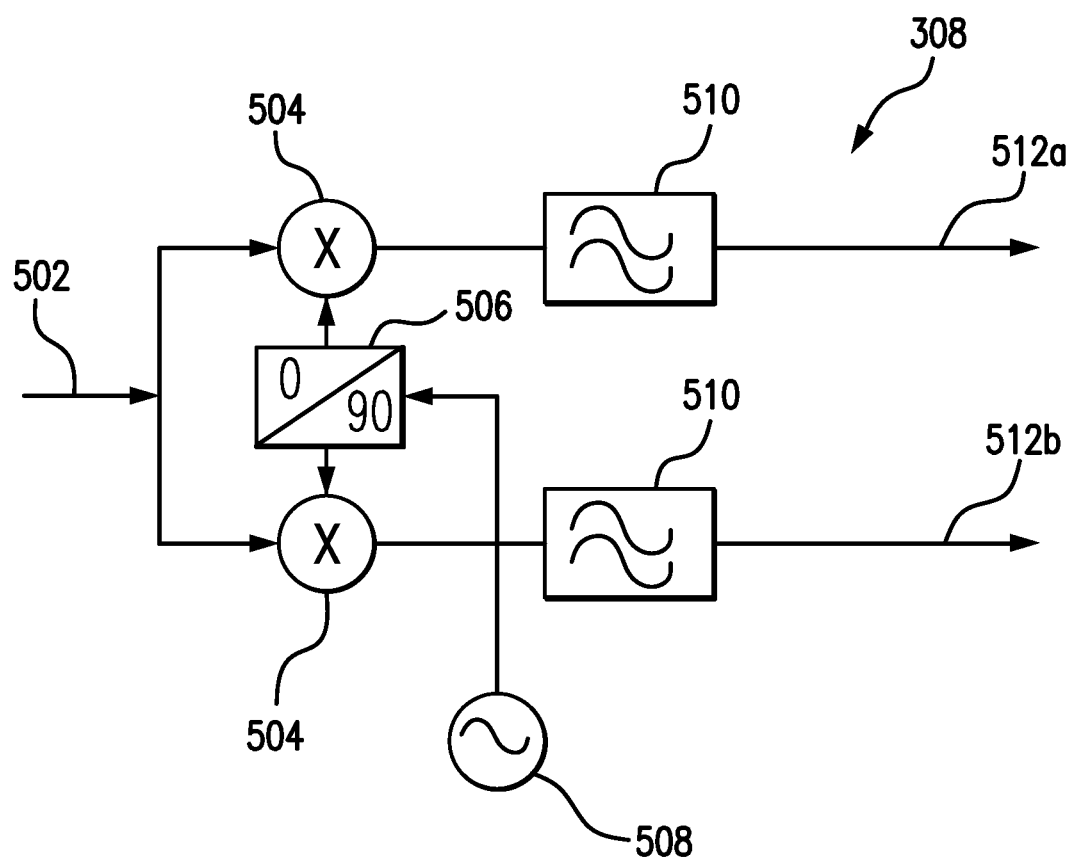
FIG. 5 is a block schematic circuit of an exemplary data demodulator shown in FIG. 3, made in accordance with an embodiment of the present invention.

FIG. 5 is a block schematic circuit of an exemplary data demodulator shown in FIG. 3, made in accordance with an embodiment of the present invention. Referring to FIG. 5, RF signals 502 received from amplifier 304, which may be a frequency modulated, differentially encoded input signals, for example, $f_c \pm \Delta f$, are applied to quadrature mixers 504 to which a frequency substantially equal to carrier frequency $f_c$, is applied from a local oscillator 508 via a 90° phase shifter 506. The outputs of the mixers 504 are filtered in low pass filters 510 which will pass the modulation frequency $\Delta f$. In an alternative arrangement, not shown, the low pass filters 510 may be omitted and the low pass filtering is done in the mixers 504. Thus, in the in-phase component I 512a of the signal is $+\Delta f$ or $-\Delta f$ and in the quadrature component Q 512b of the signal is $+\Delta f-90$ or $-\Delta f-90$. By the way of example, $f_c$ may be approximately 1.0005 MHz and the deviation frequency $\Delta f$ would be a 0.5*4.3125 kHz. In order to decode the signals in the I and Q components, the outputs 512a and 512b of the filters 510 are applied to A/D converter 310 shown in FIG. 3.

As previously indicated, A/D converter 310 preferably generates digital signals representative of RF signals captured by DSL interface 302. Many service provider (SP) networks utilize Ethernet networks. Ethernet is a technology that originated based on the idea of peers on a network sending messages in what was essentially a common wire or channel. Each peer has a globally unique key, known as the Media Access Control (MAC) address to ensure that all systems in an Ethernet have distinct addresses. Typically, modern Ethernet installations use Ethernet switches (also referred to as "bridges") to implement an Ethernet "cloud" or "island" that provides connectivity to the attached devices. The switch functions as an intelligent data traffic forwarder in which frames are sent to ports where the destination device is attached.

Figure 6:
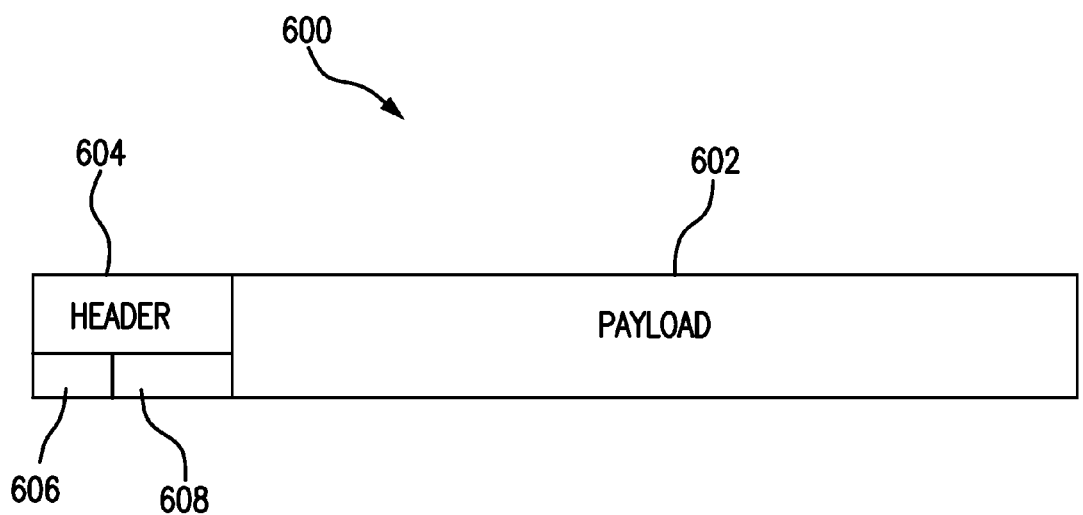
FIG. 6 is a diagram illustrating exemplary data stream packet, in accordance with an embodiment of the present invention.

FIG. 6 is a block diagram that illustrates a generalized data packet 600 communicated over a DSL line, such as DSL line 206. Each packet typically comprises one or more payloads of data, e.g. payload 602, each encapsulated by at least one network header, e.g., header 604. For example, payloads are encapsulated by appending a header before the payload, sometimes called prepending a header, and sometimes by appending a trailer (or tail) after the payload. Header 604 is formatted in accordance with a network communication protocol. For example, IP header 604 may be formatted according to IP protocol. As used herein a header for a particular protocol and its payload constitute a data packet for that protocol and may also be called a cell, frame, datagram or message for that protocol. In some publications data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and the next protocol in the payload, if any. For example, the header 604 for the IP protocol includes type fields 606, 608. The header for a protocol often includes a destination address or a source address, or both, for the information in the payload. For example, the header 604 for the first protocol includes address fields 606, 608 where the source and receiver address for the IP protocol is located within the packet 600. Typically, a transmitted data packet's network headers include at least a physical link (layer 1) header, a data-link (layer 2) header, possibly an internetwork (layer 3) header and possibly a transport (layer 4) header.

The physical (layer 1) header defines the electrical, mechanical and procedural mechanisms for proper capture of the Ethernet frame, but is not captured by a Media Access Controller. The layer 1 header may include a DSL or ATM or Ethernet layer 1 header, or some combination thereof.

The data-link header provides information for transmitting the packet over a particular physical link (i.e., a communication medium), such as an Ethernet layer 2 link. An intermediate network node typically contains multiple physical links with multiple different nodes. To that end, the data-link header may specify a pair of "source" and "destination" network interfaces that are connected by the physical link. A network interface typically contains the mechanical, electrical and signaling circuitry and logic used to couple a network node to one or more physical links. As described above, a network interface is often associated with a hardware-specific address, known as a MAC address. Accordingly, the source and destination network interfaces in the data-link header are typically represented as source and destination MAC addresses. The data-link header may also store flow control, frame synchronization and error checking information used to manage data transmissions over the physical link.

In accordance with an embodiment of the present invention, source and destination MAC addresses may be used by testing device 208 as means that uniquely identify the subscriber DSL line under test. It is noted that in alternative embodiments, IP addresses and/or unique portions of payload, such as payload 602, may also be utilized for DSL line identification purposes. It is noted that at least some of the current network protocol standards do not allow encryption of the standard Ethernet header and MAC address. Accordingly, in one embodiment, in response to receiving a bit stream (digital signals) from A/D converter 310, DSL test manager 318 executed by controller 312 may decode the received bit stream to extract the desirable information (i.e., MAC addresses) from packet headers. In other words, this process of decoding a bit stream representative of signals transmitted over a DSL line under test enables DSL test manager 318 to decode the MAC address (or another specific subscriber identifier) yielding the unique identifier information that is otherwise missing from a DSL only circuit.

Figure 7:
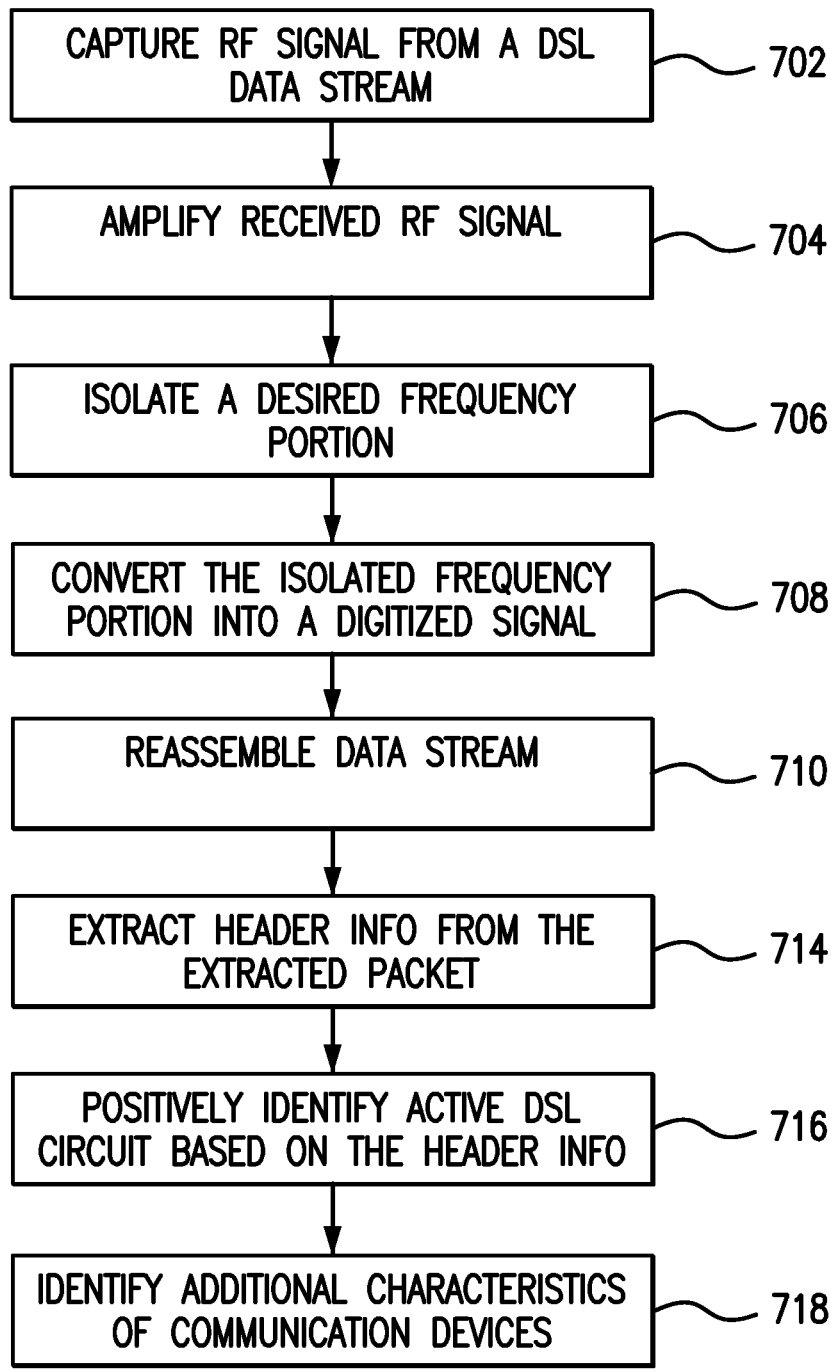
FIG. 7 is a flowchart illustrating an exemplary process for identifying a DSL line under test using a hand held test instrument, in accordance with an embodiment of the present invention.

FIG. 7 is a flowchart illustrating an exemplary process for identifying a DSL line under test using a hand held test instrument, in accordance with an embodiment of the present invention. Before turning to description of FIG. 7, it is noted that the flow diagram in FIG. 7 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be performed.

According to an embodiment of the present invention, at 702, testing device 208 may be utilized to capture RF signals representative of data stream being transmitted over a DSL line under test 206. In one embodiment, DSL interface 302 of testing device 208 may be capable to detachably connect to and make electrical contact with a small portion (e.g., a half-twist) of the twisted-pair telephone line 206. In alternative embodiment, DSL interface 302 may comprise a non-contact magnetic probe such as Faraday loop described above. In this embodiment a user may place a portion of testing device 208 in relatively close proximity to DSL line under test 206 to measure the magnitude of the current flowing through DSL under test 206. In response, DSL interface 302 may generate a low-power RF signal representative of an amplitude modulated electromagnetic field sensed by DSL interface 302 and may provide the signal to RF amplifier component 304 of testing device 208.

At 704, RF amplifier 304 preferably amplifies a relatively weak RF signal to useful amplitude. RF power amplifier 304 may comprise an electronic amplifier used to convert the received low-power radio-frequency signal into a larger signal of significant power, for subsequent signal processing described below. In one embodiment, basic RF amplifier component 304 may include an input circuit, a splitter, a final stage and a combiner that operate together to deliver the amplified output signal.

At 706, testing device 208 may use one or more filters, such as band pass filters, to eliminate at least a portion of the captured signal that is unnecessary to the analysis of the signaling used in digital communication circuits. The band pass filters may comprise capacitance, inductance and resistance elements arranged to pass frequencies within a continuous band, defined by an upper and a lower cutoff frequency, and substantially to attenuate all frequencies above and below that band. Many such circuit arrangements are known to the art, and several types of devices have been used in the construction of band pass filters. Embodiments of the present invention are particularly concerned with an integrated circuit band pass filter that is especially well suited to selecting the frequency of interest for demodulation purposes. In some embodiments, band pass filters may be components of a demodulator 308.

Next, at 708, the isolated portion of a specific frequency band can be converted into digitized form. In one embodiment, this can be accomplished by a quadrature demodulator 308 the output of which is coupled to A/D converter 310. Quadrature demodulator 308 is preferably capable of synchronously detecting two baseband signals, e.g., an I signal and a Q signal that are in quadrature with each other, such as signals modulated by QAM. The in phase (I signal) and quadrature signals (Q signal) are commonly and collectively referred to as quadrature signals. As described above, for the actual data transfer DSL modem 202 and DSLAM 204, data is transferred using bit streams. Thus, in response to receiving quadrature signals from quadrature demodulator 308, A/D converter 310 preferably converts these quadrature signals representative of RF signals captured by DSL interface 302 into a corresponding bit stream.

A bit stream can carry multiple channels. Accordingly, at step 710, DSL test manager 318 may reassemble a particular data stream of interest. For example, the bit stream converted at step 708 may contain packet fragments. Thus, at step 710, DSL test manager 318 may segregate data corresponding to different channels. For a particular channel, data may then be aggregated to recreate packet fragments. Once the fragments are recreated, they are, if required, resequenced by DSL test manager 318.

After resequencing fragments to reassemble the packet of interest, at 714, DSL test manager 318 may further process the reassembled packet to extract relevant header information. The exemplary structure of the header fields is discussed in more detail above with reference to FIG. 6. Once the pertinent fields are extracted (such as MAC addresses and/or IP addresses), at 716, DSL test manager 318 then checks to see if the data packet is associated with a subscriber's DSL modem 202 based on, for example, MAC address associated with the DSL modem 202. In yet another alternative embodiment, DSL test manager 318 may utilize session ID information to identify subscriber's equipment and thus the DSL line under test. A session, or traffic flow, is comprised of all the data packets that form a unique session across the network, for example, a session could be composed of a TCP/IP session for email or web browsing, a UDP session for streaming video, or any other complete traffic flow across the DSL line under test. For example, DSLAM 204 may assign a session id to the first data packet sent to DSL modem 202 for a new session, and each subsequent packet in the session is associated with that session id. Thus, extracted session id information may be utilized by DSL test manager 318 to identify the unique DSL circuit. In response to determining identification information associated with the DSL line under test, DSL test manager 318 may provide this information to a user. In various embodiments, DSL test manager 318 may be configured to present DSL line identification information to users in various manners, including by presenting the determined MAC address of subscriber's DSL modem 202 on display 210 of testing device 208. In an alternative embodiment, testing device 208 may send DSL line identification information to an external data repository (not shown in FIG. 3) for later analysis of the circuit.

In optional step 718, DSL test manager 318 may further analyze data included in the reassembled bit stream to identify additional characteristics of DSL equipment connected to the DSL line under test. For instance, DSL test manager 318 may determine information which can be used to improve the accuracy of locating impaired equipment. Such information can include, without limitation, information relating to measurement of noise, amplitude, phase, jitter, and the like.

In summary, various embodiments of the present invention contemplate advantageous non-intrusive identification of a DSL line under test using a hand held testing device. The disclosed device may include an interface capable of coupling to an active DSL line under test either with or without direct electrical contact. Furthermore, the disclosed means of ascertaining identity of the DSL line are advantageously designed to avoid any disruption of a data stream transmission over the DSL line under test.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hand held test instrument for testing a Digital Subscriber Line ("DSL"), the instrument comprising:
   an interface for unintrusive connection with a DSL under test, the interface configured to capture Radio Frequency (RF) signals corresponding to a portion of a data stream transmitted by a communication device over the DSL under test;
   a controller module configured to identify unique characteristics of the communication device based on the captured RF signals;
   at least one amplifier configured to amplify the captured RF signals;
   a quadrature amplitude demodulator communicatively coupled to the amplifier, wherein the quadrature amplitude demodulator configured to derive first and second components of the amplified RF signals; and
   an Analog-to Digital (A/D) converter having an input communicatively coupled to an output of the quadrature amplitude demodulator and configured to convert the first and second components of the captured RF signals to yield digitized signals wherein the digitized signals comprise one or more data packets, with each data packet having a header and being representative of the portion of the data stream transmitted by the communication device over the DSL under test.

2. The hand held test instrument of claim 1, wherein the controller module is communicatively coupled to an output of the A/D converter and wherein the controller module is configured to extract at least header information from the one or more data packets and wherein the controller module is configured to identify unique characteristics of the communication device based on the extracted header information.

3. The hand held test instrument of claim 1, wherein the unique characteristics of the communication device comprise a Media Access Control (MAC) address associated with the communication device.

4. The hand held test instrument of claim 1, wherein the interface for unintrusive connection with the DSL under test comprises a magnetic field probe.

5. The hand held test instrument of claim 1, wherein the controller module comprises a processor.

6. The hand held test instrument of claim 1, wherein the controller module comprises a Field Programmable Gate Array (FPGA) chip.

7. The hand held test instrument of claim 2, further comprising a display unit configured to display the identified unique characteristics of the communication device.

8. A method for identifying a Digital Subscriber Line ("DSL") using a hand held test instrument, the method comprising the steps of:

capturing Radio Frequency (RF) signals corresponding to a portion of a data stream transmitted by a communication device over the DSL under test by placing an interface of the hand held test instrument within a predetermined distance from the DSL under test;

isolating a desired frequency portion of the captured RF signals;

converting the isolated frequency portion of the captured RF signals into digitized signals; and identifying unique characteristics of the communication device, by a controller module of the hand held test instrument, based on the converted digitized signals amplifying the captured RF signals prior to the step of isolating the desired frequency portion;

deriving first and second components of the amplified RF signals using a quadrature amplitude demodulator; and converting the first and second components of the quadrature signals to yield digitized signals, wherein the digitized signals comprise one or more data packets, with each data packet having a header and being representative of the portion of the data stream transmitted by the communication device over the DSL under test.

9. The method of claim 8, further comprising extracting at least header information from the one or more data packets and identifying unique characteristics of the communication device based on the extracted header information.

10. The method of claim 8, wherein the unique characteristics of the communication device comprise a Media Access Control (MAC) address associated with the communication device.

11. The method of claim 8, wherein the interface for unintrusive connection with the DSL under test comprises a magnetic field probe.

* * * * *